United States Patent Office 2,783,354
Patented Feb. 26, 1957

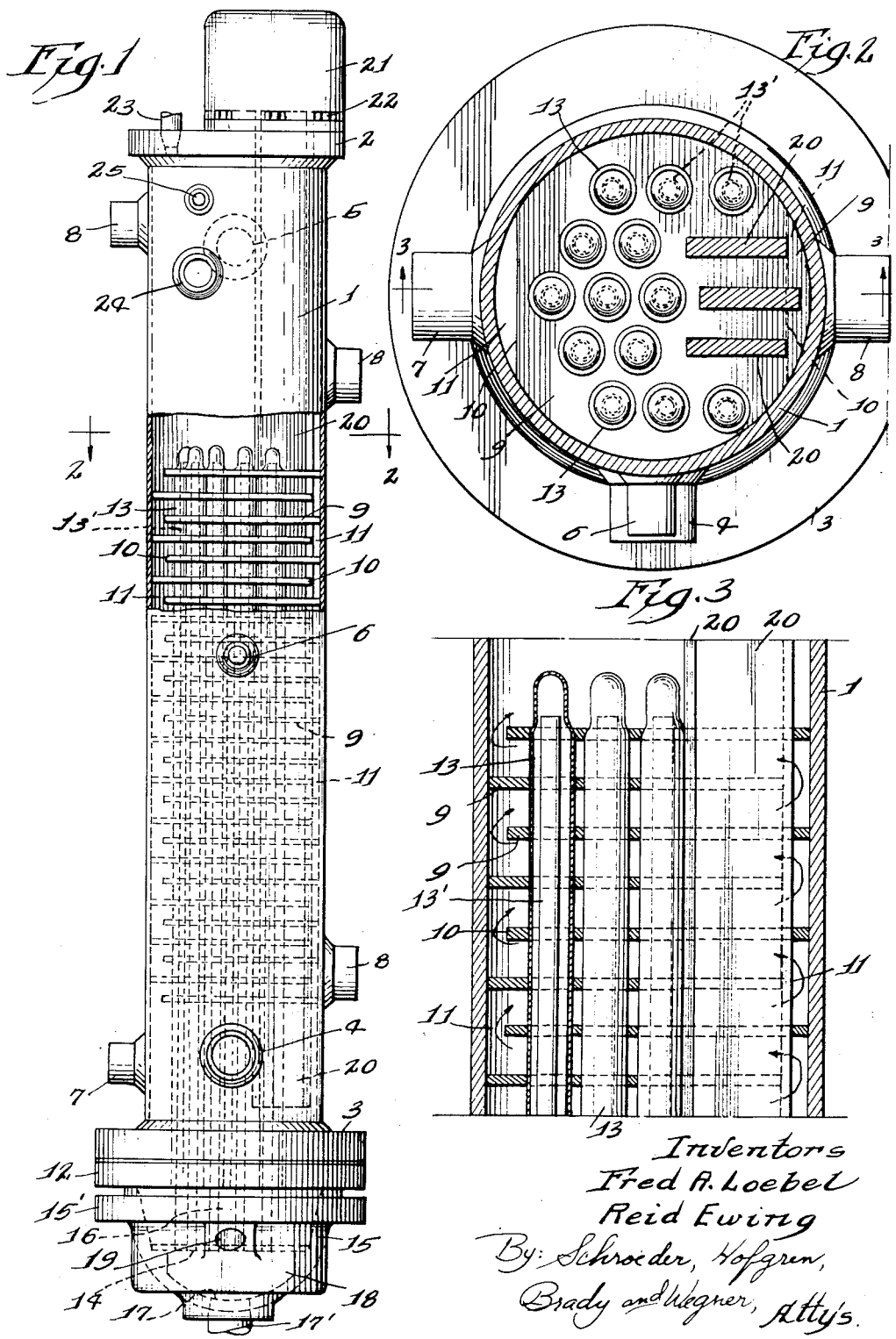

2,783,354
COMBINATION STEAM-ELECTRIC OIL HEATER

Fred A. Loebel and Reid Ewing, Milwaukee, Wis., assignors to Cleaver-Brooks Company, a corporation of Wisconsin Application September 17, 1954, Serial No. 456,734

3 Claims. (Cl. 219—39)

This invention relates to a fluid preheater and more particularly to an oil preheater for use in conjunction with a burner.

The general object of this invention is to provide an improved oil preheater of the character described, wherein both electrical and steam heating means are provided for preheating oil to be used in a steam generating system.

Another object of this invention is to provide an oil preheater of the character described for use with a steam generating system in which electrical heating elements are initially utilized to preheat the oil, but with steam tubes taking over the oil preheating as soon as sufficient steam has been developed by the system, the electrical and steam heating means being located in the same casing and at all times in contact with the oil to avoid unnecessary duplication of parts, such as external tubing.

A further object of this invention is to provide an oil preheater of the character described in which the oil enters at one end of an elongated cylindrical casing and is discharged at the opposite end; a number of baffles being positioned in the casing side by side and transverse to the flow of oil through the casing, each of said baffles having an edge opening for the passage of oil past the baffle, the baffles being positioned such that the oil passages of adjacent baffles are alternately placed at opposite sides of the casing so as to provide a tortuous path for the flow of oil through the casing; a number of steam tubes and elongated heating elements passing through all of the baffles so that as the oil flows between adjacent baffles it flows around the steam tubes and the electrical heating elements; and separate control means being provided to regulate the amount of steam admitted to the tubes and to energize the electrical heating elements with the electrical control means being set at a lower temperature than the steam control means.

Other objects and advantages will become apparent from the following detailed description taken in connection with the accompanying drawings, in which:

Fig. 1 is an elevational view of a preferred form of the invention with a portion of the casing cut away to better show the interior arrangement of the electrical heating elements, the steam tubes and the baffles;

Fig. 2 is a sectional view transverse the casing and taken substantially along line 2—2 of Fig. 1; and Fig. 3 is a fragmentary sectional view taken substantially along line 3—3 of Fig. 2 and indicating the flow of oil through the baffles and around the steam tubes and the electrical heating elements.

While the invention herein described is a preferred embodiment, it is not intended to limit the invention to the specific form and arrangements shown, it being contemplated that various changes may be made by those skilled in the art without departing from the spirit and scope of the appended claims.

In the past it has been customary to heat fuel, particularly the heavy oils, before it is fed to the burners. This has been done prior to burner operation or at the starting of a steam generating plant by auxiliary gas burners, by separate electric heaters and sometimes by other means. This has necessitated additional equipment over that necessary to heat the oil after the steam generating plant has been placed in operation, since the oil may more economically be heated by steam from the generator, once pressure has been built up. The present invention does away with the necessity of the auxiliary gas burner, separate electric heaters or other means. With the present invention a single preheater casing is utilized for heating the oil before starting the burner and also after sufficient steam is available to take over the preheating operation.

The preheater may most conveniently be made of an appropriate size and length of pipe fitted with end flanges and nipples for connections as required. The embodiment illustrated is made of 6-inch pipe and is about 36 inches long, excluding the electrical controls. Other sizes may be chosen depending upon capacity and other factors.

In Fig. 1 is shown an elongated, cylindrical casing or shell 1 having a flanged end plate 2 secured to the upper end and a flanged end plate 3 secured to the lower end. An oil inlet 4 is welded in the casing adjacent the lower end thereof with an oil outlet 5 being welded in the casing adjacent the upper end thereof. Approximately midway between the oil inlet 4 and oil outlet 5 is an oil pressure relief valve 6. A drain outlet 7 is provided at the bottom of casing 1 for draining oil from said casing. Also shown in Fig. 1 are a number of blanked nipples 8 which may be used for a sight glass and other purposes.

Casing 1 has a plurality of baffles 9 positioned therein parallel to each other and transverse to the general longitudinal direction of flow of oil through casing 1. Each baffle 9 is in the form of a flat, generally circular disc having one straight edge 10 which defines with the shell or casing 1 a lateral, peripheral or edge opening 11 for the passage of oil past the baffle 9. The arcuate edge of each baffle contacts the inside of the casing wall to prevent passage of oil past the baffle except through the opening 11 between the straight edge and the casing wall. Baffles 9 are positioned in casing 1 in a staggered relationship so that peripheral or edge openings 11 of adjacent baffles 9 are positioned alternately at opposite sides of casing 1, thus forming a twisting or tortuous path for the flow of oil from oil inlet 4, between baffles 9, to oil outlet 5.

The oil pumped through the casing is heated to make it more fluid before it reaches the burner proper. In the present embodiment, means are provided to utilize steam generated by an associated steam generator for heating the fuel oil. A tube sheet 12 is secured to flanged end plate 3 and in turn has secured therein a plurality of steam tubes 13 which extend upwardly into casing 1 and through the plurality of baffles 9. The steam tubes 13 are closed at the ends opposite tube sheet 12 and have extending upwardly therein concentric re-entrant tubes 13', as shown in broken away portion of Fig. 3. Re-entrant tubes 13' extend below steam tubes 13 and are secured at their lower ends in a second tube sheet 14. Tube sheet 14 is positioned in a lower casting 15 which has a mating flanged plate 15' attached to tube sheet 12 so that a cavity 16 is formed between tube sheets 12 and 14. At the bottom portion of lower casting 15 is a steam inlet 17 which communicates with the open ends of tubes 13' in tube sheet 14 through a cavity 18. Thus, the incoming steam flows upwardly within re-entrant tubes 13' to the upper ends thereof when the steam and/or condensate may flow downwardly between the concentric walls of tubes 13 and 13'. The steam between the walls of tubes 13 and 13' being more closely adjacent the oil being heated than the rising steam within tubes 13' tends to condense. This steam condensate will drain downwardly into cavity 16 from which it is drained off through a threaded hole 19 in lower casting 15.

Electrical heating means are also provided in the same casing. Extending downwardly through upper flanged end plate 2 into casing 1 and through baffles 9 are a plurality of elongated heating elements 20, which elements are generally parallel to each other and to steam tubes 13. The upper ends of heating elements 20 are received in a terminal cover 21 which is fastened to upper flanged end plate 2 in some manner, such as by bolts 22 shown in Fig. 1. Terminal cover 21 contains means for energizing heating elements 20 including the usual terminals and wires. Also located in upper flanged end plate 2 is a manually controlled air vent 23 to allow the discharge of the air in casing 1 as oil is pumped in through oil inlet 4 to initially fill the preheater. Should air accumulate in the casing during subsequent use, the air vent may be used to remove such air.

Located in casing 1 near oil outlet 5 is a thermostatic steam control means 24 which may be of the bulb and capillary tube type. Steam control means 24 is adapted to operate a conventional steam valve (not shown) in a steam supply line 17' to control the amount of steam admitted to re-entrant tubes 13'. Also located in casing 1 near oil outlet 5 is an electrical thermostatic control means 25 which automatically energizes or de-energizes electrical heating elements 20. Electrical thermostatic control means 25 is set at a temperature lower than the temperature setting of steam control means 24.

In the operation of this oil preheater in a steam generating system, electrical heating elements 20 are initially energized to heat the oil being pumped into casing 1. Electrical heating elements 20 remain energized, thus heating the oil to the proper temperature for combustion in the burner of the associated steam generating system. After the oil has reached a pre-set temperature, controls automatically allow the boiler to start. As a result of the boiler operation, steam is generated which begins to flow into re-entrant tubes 13'. Since steam control means 24 is set at a slightly higher temperature than electrical thermostatic control 25, once the generated steam has reached a temperature above the temperature setting of electrical thermostatic control 25, electrical thermostatic control 25 will de-energize heating elements 20. As long as steam is being generated by the system the oil passing through the casing will be heated solely by the steam in tubes 13 and 13'. If the temperature of the oil drops below the desired temperature, steam control means 24 will automatically admit more steam to re-entrant tubes 13' thereby bringing the oil up to the desired temperature before the temperature can drop sufficiently to have electrical heating elements 20 energized by electrical thermostat 25. As steam control means 24 is set at a temperature higher than electrical thermostatic control means 25, the electrical heating elements 20 will never be energized during normal operating conditions, being utilized to heat the oil only when the steam generating system is initially being started up.

The arrangement of baffles 9 with oil passages 11 in adjacent baffles being placed alternately at opposite sides of casing 1 insures multiple passes of the oil passing through the casing around steam tubes 13 and electrical heating elements 20, which both pass completely through the series of baffles 9.

The path of flow of oil between each pair of baffles 9 and around steam tubes 13 and electrical heating elements 20 is best shown in Fig. 3, the oil flow past the baffles being indicated by the arrows. To insure repeated passes of the oil around steam tubes 13 and electrical heating elements 20, it has been found in the embodiment illustrated very satisfactory to have the ratio of the spacing between baffles to the inner circumference of the shell or casing in the order of approximately 1 to 9.

It should be pointed out that this ratio varies with the size of the preheater, type of fuel used, and other variable factors.

This preheater also has economical advantages over oil preheaters used in the past, both in the cost of initial installation and in the operating cost of the unit. As all of the heating members, both the electrical elements for initial heating and the steam tubes for heating during normal operation, are conveniently located in one casing in this oil preheater, the cost of providing additional equipment, such as external tubing and auxiliary gas burners is eliminated.

It is common practice to use separate steam and electric oil preheaters with the oil passing through the steam heater first and then through the electric heater. Before steam is available from the boiler, the oil in the steam heater is colder than it is during normal operation and the pressure drop through the steam heater is often so high that it is necessary to by-pass this heater. This is avoided in a combination heater, the electric heater providing heat to lower the viscosity of the oil flowing over the steam tubes.

We claim:

1. An oil preheater for use in a steam generating unit comprising, a cylindrical shell having a flanged end plate secured to each end, an oil inlet positioned adjacent one end of said shell and an oil outlet positioned adjacent the opposite end of said shell, a plurality of flat baffles in the form of substantially circular discs having a segment cut away to provide a passage for the flow of oil between said baffle and said shell, said baffles being fixedly positioned in parallel spaced relation in said shell and transverse to the general longitudinal flow of oil therethrough, said oil passages being alternately positioned at opposite sides of said shell so as to provide a long tortuous path for the flow of oil from said oil inlet to said oil outlet, a first tube sheet secured to one of said flanged end plates and having secured therein a plurality of steam tubes extending substantially parallel to each other into said shell and through said plurality of baffles, said steam tubes being closed at their inner ends, a lower casting having a mating flanged plate secured to said first tube sheet, a plurality of re-entrant tubes extending concentrically upwardly within said steam tubes and substantially to the closed end of said steam tubes, a second tube sheet positioned in said lower casting below said first tube sheet, said re-entrant tubes being secured in said second tube sheet so as to conduct steam into the upper end of the steam tubes, said lower casting having a drain outlet positioned between said tube sheets to drain off the steam condensate formed between the walls of said concentric steam and re-entrant tubes, a plurality of elongated electrical heating elements extending through said other flanged end plate into said shell and through said baffles, said elements being substantially parallel to each other and to said steam tubes, an electrical thermostat for energizing said heating elements, and a bulb and capillary tube control means set at a temperature above the setting of said electrical thermostat and operable to control admission of steam into said re-entrant tubes, both of said thermostats being positioned near said oil outlet, the staggered positioning of said oil passages insuring multiple passes of oil around said steam tubes and electrical heating elements as it flows through said shell, said electrical heating elements adapted to initially heat the oil passing through said shell but adapted to be de-energized after the steam in said tubes has reached a temperature sufficient to heat the oil to the desired temperature, above the setting of said electrical thermostat.

2. An oil preheater for use in a steam generating unit comprising an elongated shell having a flanged end plate secured to each end, an oil inlet in said shell adjacent one end thereof, an oil outlet adjacent the other end thereof, a series of baffles having edge openings therein fixedly positioned side by side in said shell and transverse to the longitudinal axis thereof, said baffles being positioned so that said openings are located alternately at opposite sides of said shell to form a long twisting path for the flow of oil through said shell, a plurality of elongated, electrical heating elements extending through one of said flanged end plates into said shell and through said baffles for initial heating of oil passing between said baffles, an electrical thermostat positioned near said oil outlet for energizing said electrical heating elements, a first tube sheet secured to the other of said flanged end plates, a first series of parallel steam tubes extending axially into said shell and through said baffles, each of said steam tubes having an open end secured in the first tube sheet and an opposite closed end, a lower casting secured to said first tube sheet and having a second tube sheet secured therein and spaced from said first tube sheet, a second series of steam tubes concentrically positioned in said first series of steam tubes and having the lower ends secured in said second tube sheet and the upper ends being closely adjacent to the closed ends of said first series of steam tubes forming a passage for steam therebetween, said lower casting having a steam inlet for conducting steam to said second series of steam tubes to heat the oil around the tubes and a drain outlet for steam condensate formed between the walls of each pair of concentric steam tubes, thermostatic means positioned near said oil outlet for controlling the amount of steam admitted to said steam tubes, said steam thermostatic means being operable at a higher temperature than said electrical thermostatic means, an oil pressure relief valve in said shell, and a number of blanked nipples in said shell to be used for a sight glass and other purposes.

3. An oil preheater comprising a cylindrical casing having an oil inlet at one end and an oil outlet at the other end, a plurality of baffles fixedly positioned in said casing parallel to each other and transverse to the longitudinal flow of oil through said casing, each of said baffles being in the form of a flat, generally circular disc having a straight edge spaced from said shell and defining with said shell an oil passage past said baffle, parallel steam tubes extending into said casing and through said baffles, thermostatic means operable to admit steam to said tubes, electrical heating elements extending into said casing and through said baffles, electrical thermostatic means for energizing said elements, said means being set at a lower temperature than said steam control means so that said oil is electrically heated initially and until sufficient steam has been produced to heat the oil above the temperature setting of said electrical thermostatic means, said baffles being positioned in said casing so that said oil passages are placed alternately at opposite sides of said casing so as to provide multiple passes of oil around said heating elements and steam tubes while passing around said baffles.

References Cited in the file of this patent
UNITED STATES PATENTS

| | | |
|---|---|---|
| 1,554,869 | McAndrews | Sept. 22, 1925 |
| 1,752,548 | Baird | Apr. 1, 1930 |
| 1,761,975 | Baird | June 3, 1930 |
| 1,826,747 | Davis | Oct. 13, 1931 |
| 1,862,690 | Macrae | June 14, 1932 |
| 1,972,374 | Brannigan | Sept. 4, 1934 |
| 2,179,846 | Finnigan | Nov. 14, 1939 |
| 2,351,239 | Thompson | June 13, 1944 |